(12) United States Patent
Karam et al.

(10) Patent No.: US 11,695,615 B2
(45) Date of Patent: *Jul. 4, 2023

(54) CONFIGURING A NETWORK

(71) Applicant: Apstra, Inc., Menlo Park, CA (US)

(72) Inventors: Mansour Jad Karam, Menlo Park, CA (US); Aleksandar Luka Ratkovic, Palo Alto, CA (US); Andrew Samoylov, San Jose, CA (US)

(73) Assignee: Apstra, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,855

(22) Filed: Nov. 22, 2021

(65) Prior Publication Data
US 2022/0086033 A1    Mar. 17, 2022

Related U.S. Application Data

(63) Continuation of application No. 16/452,412, filed on Jun. 25, 2019, now Pat. No. 11,223,512, which is a
(Continued)

(51) Int. Cl.
*H04L 41/046* (2022.01)
*G06F 16/13* (2019.01)
(Continued)

(52) U.S. Cl.
CPC ............ *H04L 41/046* (2013.01); *G06F 16/13* (2019.01); *H04L 41/022* (2013.01);
(Continued)

(58) Field of Classification Search
CPC . H04L 41/046; H04L 41/022; H04L 41/0806; H04L 41/12; G06F 16/13
See application file for complete search history.

(56) References Cited

U.S. PATENT DOCUMENTS 7,636,771 B2    12/2009 Torii
7,870,238 B2 *   1/2011 Pusateri ................ H04L 41/022
                                                          709/227
(Continued)

FOREIGN PATENT DOCUMENTS

CN    101310263 A    11/2008
CN    101582794 A    11/2009
(Continued)

OTHER PUBLICATIONS

U.S. Appl. No. 16/400,936, filed May 1, 2019, naming inventors Ratkovic et al.
(Continued)

*Primary Examiner* — Mohamed A. Wasel
*Assistant Examiner* — Tesfu N Mekonen
(74) *Attorney, Agent, or Firm* — Shumaker & Sieffert, P.A.

(57) ABSTRACT

A set of network requirements is received. At least a portion of the set of network requirements is stored on a system data store. Device requirements for a plurality of network devices are stored on the system data store. At least a portion of the stored device requirements is received at a proxy agent. Native hardware instructions are generated based on the received device requirements to configure at least one of the plurality of network devices.

20 Claims, 5 Drawing Sheets

Related U.S. Application Data continuation of application No. 14/542,463, filed on Nov. 14, 2014, now Pat. No. 10,389,573.

(51) Int. Cl.
   *H04L 41/022* (2022.01)
   *H04L 41/0806* (2022.01)
   *H04L 41/0803* (2022.01)
   *H04L 41/12* (2022.01)

(52) U.S. Cl.
   CPC ...... *H04L 41/0803* (2013.01); *H04L 41/0806* (2013.01); *H04L 41/12* (2013.01)

(56) References Cited

U.S. PATENT DOCUMENTS

| | | | |
|---|---|---|---|
| 8,156,207 B2 | 4/2012 | Wood et al. | |
| 8,386,593 B1 | 2/2013 | Gao et al. | |
| 8,737,993 B2 | 5/2014 | Alves et al. | |
| 8,782,182 B2 | 7/2014 | Chaturvedi et al. | |
| 8,819,202 B1 | 8/2014 | Carolan et al. | |
| 8,849,973 B2 | 9/2014 | Leib et al. | |
| 8,869,236 B1 * | 10/2014 | Tonogai | H04L 63/08 713/153 |
| 9,037,969 B2 | 5/2015 | Wolff-Petersen et al. | |
| 10,063,428 B1 | 8/2018 | Karam et al. | |
| 10,277,461 B1 | 4/2019 | A et al. | |
| 10,313,206 B1 | 6/2019 | Karam et al. | |
| 10,333,776 B2 | 6/2019 | Karam et al. | |
| 10,374,872 B2 | 8/2019 | Ratkovic et al. | |
| 10,389,573 B2 | 8/2019 | Karam et al. | |
| 10,516,761 B1 | 12/2019 | A et al. | |
| 10,558,542 B1 | 2/2020 | A et al. | |
| 10,630,540 B2 | 4/2020 | Karam et al. | |
| 10,698,714 B2 | 6/2020 | Krishnamurthy et al. | |
| 10,756,983 B2 | 8/2020 | Ratkovic et al. | |
| 2002/0112053 A1 | 8/2002 | Christensen et al. | |
| 2002/0178380 A1 | 11/2002 | Wolf et al. | |
| 2004/0059812 A1 | 3/2004 | Assa | |
| 2005/0091068 A1 * | 4/2005 | Ramamoorthy | H04L 41/0893 709/203 |
| 2006/0080425 A1 | 4/2006 | Wood et al. | |
| 2006/0129670 A1 | 6/2006 | Mayer | |
| 2006/0241931 A1 | 10/2006 | Abu el Ata et al. | |
| 2007/0130192 A1 | 6/2007 | Bolder et al. | |
| 2007/0150561 A1 | 6/2007 | Courtney | |
| 2008/0162609 A1 * | 7/2008 | Bigian | H04L 67/14 |
| 2009/0059814 A1 | 3/2009 | Nixon et al. | |
| 2009/0198797 A1 | 8/2009 | Wang et al. | |
| 2009/0216867 A1 | 8/2009 | Pusateri et al. | |
| 2009/0282129 A9 | 11/2009 | Tindal | |
| 2010/0202450 A1 * | 8/2010 | Ansari | H04L 12/2814 370/389 |
| 2010/0293364 A1 | 11/2010 | Maini | |
| 2010/0306275 A1 | 12/2010 | Maheshwari et al. | |
| 2013/0060929 A1 | 3/2013 | Koponen et al. | |
| 2014/0096249 A1 | 4/2014 | Dupont et al. | |
| 2014/0136685 A1 | 5/2014 | Chan et al. | |
| 2014/0200858 A1 | 7/2014 | Chatow et al. | |
| 2015/0015376 A1 | 1/2015 | Jenkins | |
| 2015/0188774 A1 | 7/2015 | Nadaf et al. | |
| 2015/0248487 A1 | 9/2015 | Baranowski et al. | |
| 2015/0379409 A1 | 12/2015 | Hu et al. | |
| 2016/0188767 A1 | 6/2016 | Razin | |
| 2016/0342510 A1 * | 11/2016 | Pani | G06F 12/0615 |
| 2016/0344772 A1 | 11/2016 | Monahan et al. | |
| 2017/0109907 A1 | 4/2017 | Hamedani | |
| 2017/0250881 A1 | 8/2017 | Kellicker | |
| 2017/0331828 A1 | 11/2017 | Caldera et al. | |
| 2018/0137155 A1 | 5/2018 | Majumdar | |
| 2018/0210927 A1 | 7/2018 | Karam et al. | |
| 2018/0316576 A1 | 11/2018 | Kang et al. | |
| 2019/0173805 A1 | 6/2019 | Balan et al. | |
| 2019/0238423 A1 | 8/2019 | Karam et al. | |
| 2019/0306015 A1 | 10/2019 | Ratkovic et al. | |
| 2019/0319830 A1 | 10/2019 | Karam et al. | |
| 2020/0007495 A1 | 1/2020 | Balamurugan et al. | |
| 2020/0136917 A1 | 4/2020 | Kang et al. | |
| 2020/0213189 A1 | 7/2020 | Karam et al. | |
| 2020/0274772 A1 | 8/2020 | A et al. | |
| 2020/0313957 A1 | 10/2020 | A et al. | |
| 2020/0313980 A1 | 10/2020 | A et al. | |
| 2020/0326924 A1 | 10/2020 | A et al. | |
| 2020/0328949 A1 | 10/2020 | Ratkovic et al. | |
| 2020/0344171 A1 | 10/2020 | Sharma et al. | |

FOREIGN PATENT DOCUMENTS

| | | |
|---|---|---|
| CN | 103051481 A | 4/2013 |
| WO | 2007030305 A2 | 3/2007 |
| WO | 2007140337 A2 | 12/2007 |

OTHER PUBLICATIONS

Bjorklund, "YANG—A Data Modeling Language for the Network Configuration Protocol (NETCONF)," Internet Engineering Task Force (IETF), RFC 6020, Oct. 2010, 174 pp.

Enns et al., "Network Configuration Protocol (NETCONF)," Internet Engineering Task Force (IETF), RFC 6241, Jun. 2011, 114 pp.

Enns, "NETCONF Configuration Protocol," Network Working Group, RFC 4741, Dec. 2006, 96 pp.

Examination Report from counterpart European Application No. 15858564.6, dated Feb. 7, 2019, 4 pp.

Extended Search Report from counterpart European Application No. 15858564.6, dated Mar. 29, 2018, 8 pp.

First Office Action and Search Report, and translation thereof, from counterpart Chinese Application No. 201580055839.8, dated Mar. 12, 2020, 29 pp.

Harrington et al., "An Architecture for Describing Simple Network Management Protocol (SNMP) Management Frameworks," Network Working Group, RFC 3411, Dec. 2002, 65 pp.

International Preliminary Report on Patentability from International Application No. PCT/US2015/059083, dated May 26, 2017, 7 pp.

International Search Report and Written Opinion of International Application No. PCT/US2015/059083, dated Mar. 2, 2016, 8 pp.

Notice of Intent to Grant and Text Intended to Grant from counterpart European Application No. 15858564.6, dated Feb. 4, 2020, 36 pp.

Prakash et al., "PGA: Using Graphs to Express and Automatically Reconcile Network Policies," SIGCOMM '15: Proceedings of the 2015 ACM Conference on Special Interest Group on Data Communication, Aug. 2015, pp. 29-42, https://doi.org/10.1145/2785956.2787506, 14 pp.

Prosecution History from U.S. Appl. No. 14/542,463, dated Aug. 26, 2016 through Jul. 15, 2019, 147 pp.

Response to Examination Report dated Feb. 7, 2019 from counterpart European Application No. 15858564.6, filed Jun. 3, 2019, 18 pp.

Response to Extended Search Report dated Mar. 29, 2018 from counterpart European Application No. 15858564.6, filed Oct. 15, 2018, 13 pp.

Second Office Action and Search Report, and translation thereof, from counterpart Chinese Application No. 201580055839.8, dated Sep. 2, 2020, 8 pp.

U.S. Appl. No. 16/360,660, filed Mar. 21, 2019, naming inventors Rachamadugu et al.

U.S. Appl. No. 17/104,804, filed Nov. 25, 2020, naming inventors Hafeez et al.

Prosecution History from U.S. Appl. No. 16/452,412, dated Aug. 21, 2020 through Nov. 19, 2021, 87 pp.

First Office Action and Search Report from counterpart Chinese Application No. 202110186643.X dated Jan. 20, 2023, 7 pp.

* cited by examiner

CONFIGURING A NETWORK

CROSS REFERENCE TO OTHER APPLICATIONS

This application is a continuation of U.S. patent application Ser. No. 16/452,412, filed Jun. 25, 2019, which is a continuation of U.S. patent application Ser. No. 14/542,463, filed Nov. 14, 2014 (now U.S. Pat. No. 10,389,573, issued Aug. 20, 2019), which are incorporated herein by reference.

BACKGROUND OF THE INVENTION

Configuring a network has often required a network administrator to manually configure network components to create a desired network. For example, the network administrator would often have to manually configure each of many network switches, servers, storage, and other network devices to create a desired network configuration. Although partial automation solutions have been introduced by specific vendors to integrate devices of a single vendor together, these solutions often lock a user entity into only utilizing devices and solutions of a single vendor. However, it is often desirable to utilize devices and solutions from various multiple vendors to take advantage of technological advantages of different devices and solutions as well as to optimize costs. Configuration and management of the integration and use of various network devices and solutions from multiple vendors typically require a user to manually perform integration and configuration. When new devices and solutions are added, removed or modified, modification of the entire integration and configuration may need to be performed again. Manually monitoring this type of network also adds to the complexity and inefficiencies. Therefore, there exists a need for a generalized configuration, management, and monitoring solution for network devices and solutions.

BRIEF DESCRIPTION OF THE DRAWINGS

Various embodiments of the invention are disclosed in the following detailed description and the accompanying drawings.

DETAILED DESCRIPTION

Figure 1:
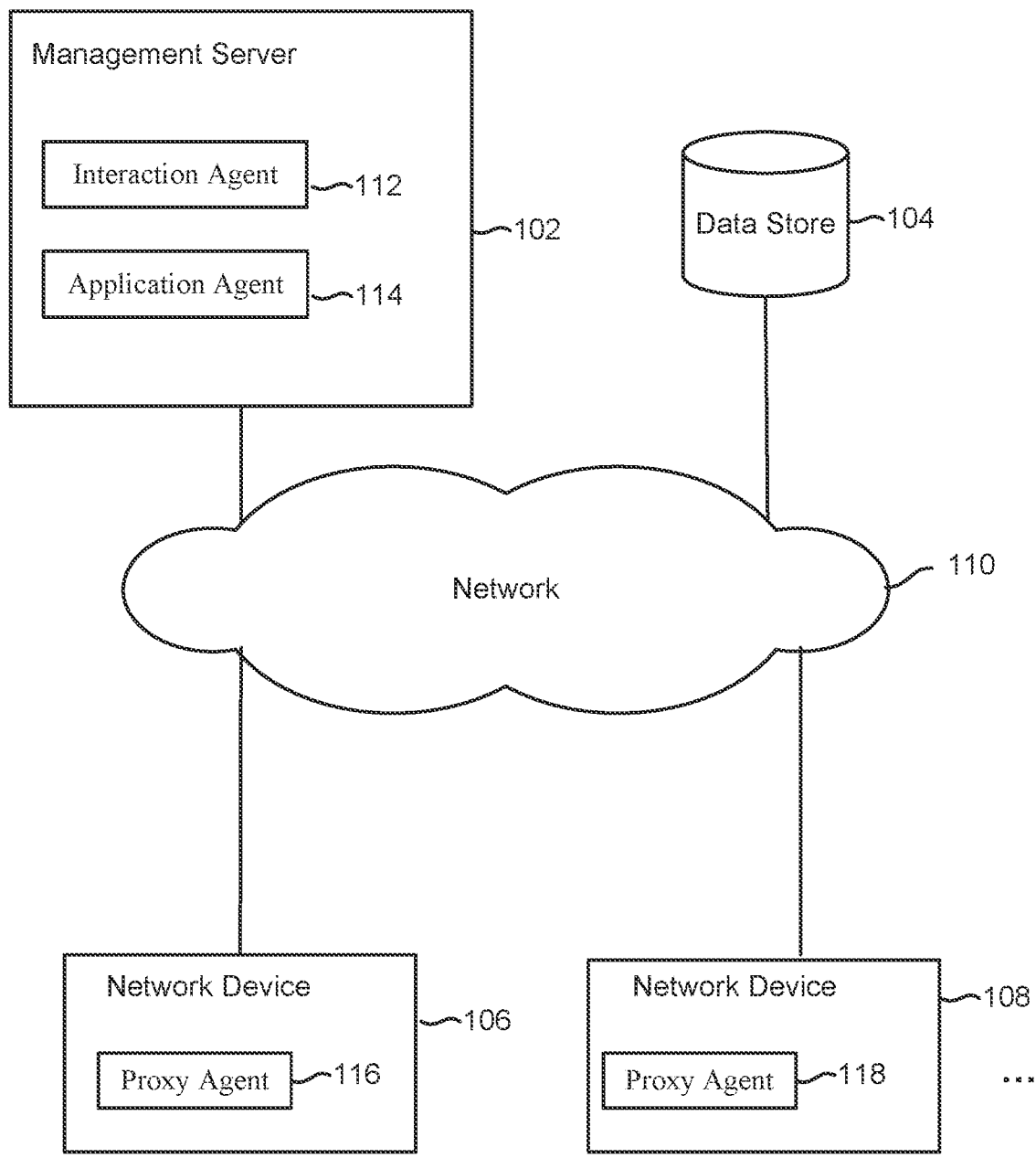
FIG. 1 is a diagram illustrating an embodiment of a network management environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuring a network is disclosed. The network may be a collection of one or more devices that are able to be connected together. In some embodiments, at least three components work together to manage, configure, and/or monitor a network. For example, an interaction agent interacts with a user to receive and provide desired requirements, specification, and status updates; an application agent implements and manages the desired requirements and status updates across various network devices; and a proxy agent of each network component implements and manages device specific configurations and status updates of its network device. A set of network requirements is received at an interaction agent. For example, desired requirements of a network configuration are received from a user via the interaction agent. At least a portion of the network requirements are published to a system data store. For example, rather than maintaining state information and managing communication between agent components directly at each agent component, the system data store is utilized to track and provide state and communications of agent components. The published network requirements are received at an application agent. For example, the application agent has subscribed to the network requirements stored in the system data store and is notified when the set of network requirements is stored in the system data store. Device requirements are published by the application agent to the system data store for a plurality of devices. For example, the application agent has identified the plurality of devices to be utilized to implement the published network requirements and has generated specific device requirements for the each of the plurality of identified devices. The applicable device requirements are received at a proxy agent of a network device. For example, each proxy agent of each of the identified devices has subscribed to and receives the corresponding device requirements of its network device. Native hardware instructions are generated by the proxy agent to configure an individual network device. For example, the proxy agent translates the received device requirements to generate the hardware instructions to implement the received device requirements.

FIG. 1 is a diagram illustrating an embodiment of a network management environment. Management server 102 is connected to data store 104, network device 106, and network device 108 via network 110. In some embodiments, management server 102 provides a network configuration, monitoring, and management solution. For example, a user may utilize a solution at least in part provided by management server 102 to setup a network configuration, setup a network device, monitor performance of a network, monitor devices of a network, automate tasks, and otherwise perform management of devices of the network. In the example shown, management server 102 is utilized to manage at least network device 106 and network device 108. Management server 102 includes interaction agent 112 and application agent 114. For example, interaction agent 112 and application agent 114 are software components and/or hardware components of management server 102.

Interaction agent 112 facilitates interaction with users to receive and provide desired requirements, specification, and status updates. For example, a user accesses interaction agent 112 via a user interface (e.g., web interface, application interface, command line interface, application programming interface (API), configuration file interface, etc.) provided directly and/or remotely (e.g., via display, wired connection, network, etc.). Using the user interface, a user may provide high level requirements that specify a desired configuration of a desired network/device and/or receive information regarding status of devices/components of the desired network and/or an implementation status regarding the desired configuration requirements. Interaction agent 112 may manage a plurality of application agents. For example, interaction agent 112 selects an application agent among a plurality of applications to achieve/complete a desired network requirement.

Application agent 114 implements and manages the desired network requirements, configurations and status updates across various network devices. In some embodiments, application agent 114 provides device requirement instructions to and receives status information from various devices of a network being managed. For example, using desired network requirements, application agent 114 determines individual device requirements to implement the desired network requirements. The device requirements determined by application agent 114 may be declarative device requirements such that the device requirements may be translated to any of a number of different native device instructions (e.g., native instruction of devices of different vendors, device versions, device operating systems, programming interfaces, etc.) to implement the device requirements. In the example shown, application agent 114 has selected network devices 106 and 108 to implement the desired network requirements and generates unique device requirements for each network device 106 and network device 108. Proxy agent 116 receives its device requirements for network device 106 and proxy agent 118 receives its device requirements for network device 108. Each proxy agent may generate native hardware instructions implementing its device requirements to configure its associated individual network device.

In some embodiments, each proxy agent reports information about a status, an operation, and/or other information of its associated device(s). Application agent 114 may then collect and process the reported information to report the information and/or perform a responsive action. For example, when a proxy agent provides a status update that its associated device is overloaded, the application agent may add a new device to a network to offload processing and/or move a processing task of the overloaded device to another network device. The collected status information may be provided by application agent 114 to interaction agent 112 as a report and/or a request for action.

Communication between interaction agent 112, application agent 114, and proxy agents 116 and 118 are facilitated via data store 104. In some embodiments, interaction agent 112, application agent 114, and proxy agents 116 and 118 do not directly communicate with each other. For example, rather than maintaining state information and managing communication between agent components directly at each agent component, the data store 104 is utilized to track and provide state information and communications of agent components. All state information (e.g., state of device, requirements, configurations, etc.) of the agents may be stored in data store 104 rather than storing state information in the agents. When data is to be communicated between the agents, a sending agent publishes/stores the data to be communicated to data store 104. The agent receiving the data may read the data from data store 104 and/or may be pushed the data. For example, an agent subscribes to be notified when a certain type of data is stored in data store 104 and the agent is notified when a new or a modification to the certain type of data is received at storage 104. In some embodiments, an agent periodically polls/checks data store 104 for data. Data store 104 may be included in a networked storage service. In the example shown, the agents access data store 104 via network 110. In some embodiments, data store 104 is directly connected to management server 102 via a non-shared connection. In various embodiments, data store 104 is included in any of the components shown in FIG. 1. For example, data store 104 is included in server 102. Data store 104 may include a server that manages data stored in data store 104 (e.g., manage data subscriptions). Examples of data store 104 include a database, a highly available storage, a distributed storage, a cloud storage, a data service, or any other type of data storage.

Network device 106 and network device 108 may be any type of device connected to network 110. Examples of network device 106 and network device 108 include a server, a network switch, a network router, a cache server, a storage device, a hypervisor switch, virtual router, a load balancer, a firewall, a network fabric device, a virtual network device, a software device, a software component or any type of computer or networking device that may be physical or virtual. Proxy agent 116 is a software and/or hardware component included in network device 106. Proxy agent 116 manages network device 106. Proxy agent 118 is a software and/or hardware component included in network device 108. Proxy agent 118 manages network device 108. Examples of network 110 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly.

Although single instances of many of the components shown in FIG. 1 have been shown to simplify the diagram, additional instances of any of the components shown in FIG. 1 may exist. For example, any number of management servers, storages, and network devices may exist. Management server 102 may be a cluster of servers and storage 104 may be a distributed storage. Any number of interaction agents, application agents, and/or proxy agents may exist. A single server/device may include any number of interaction agents, application agents, and/or proxy agents. A single interaction agent, application agent, and/or proxy agent may provide a service for a plurality of services/devices. A single interaction agent may interact with a plurality of application agents. For example, different types of network requirements and status updates may be handled by different application agents that all interface with a single interaction agent. Although the example shown in FIG. 1 shows application agent and interaction agent included/installed on the same management server, they may be included in different servers/devices. Although the example shown in FIG. 1 shows each proxy agent included/installed in their respective associated network device, the proxy agents may be included in a different server/device. For example, the proxy agents are included in management server 102. Although the example shown in FIG. 1 shows that a single proxy agent is only assigned to manage a single associated network device, in some embodiments, a single proxy agent may be assigned to manage a plurality of network devices. Components not shown in FIG. 1 may also exist. In some embodiments, each resource (e.g., each agent, server, and network device) of FIG. 1 may belong to a domain. For example, resources belonging to the same domain are interoperable and may function together to perform a network configuration and/or management task. In some embodiments, each resource may only belong to one domain and only resources within the same domain are guaranteed to be interoperable to perform a network configuration and/or management task. Certain resources may belong to a plurality of domains. Plurality of domains may be utilized to manage a single network. The components shown in FIG. 1 may be components of one or more domains. Any of the components shown in FIG. 1 may be a physical or a virtual component.

Figure 2:
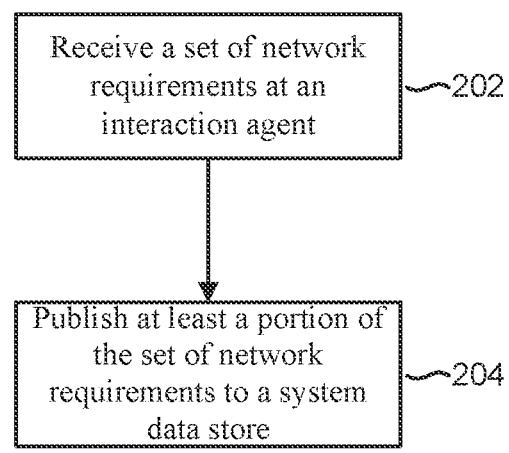
FIG. 2 is a flowchart illustrating an embodiment of a process for publishing network requirements.

FIG. 2 is a flowchart illustrating an embodiment of a process for publishing network requirements. The process of FIG. 2 may be implemented on management server 102 of FIG. 1. In some embodiments, the process of FIG. 2 is performed by interaction agent 112 of FIG. 1.

At 202, a set of network requirements is received at an interaction agent. In some embodiments, the interaction agent is an interaction agent such as interaction agent 112 of FIG. 1. The interaction agent may interface with a user and/or a user system. The interaction agent may be a software and/or hardware component and may be included in a server utilized to manage a network (e.g., manage network devices). In some embodiments, the interaction agent manages one or more application agents. For example, the interaction agent selects one or more application agents that will be implementing the set of network requirements and/or reporting on their status. A user or a user system may access the interaction agent via a user interface (e.g., web interface, visual display interface, application interface, command line interface, application programming interface (API), configuration file interface, etc.) provided directly and/or remotely (e.g., via display, wired connection, network, etc.).

In some embodiments, the set of network requirements includes a specification of a desired configuration, setting, topology, and/or other specification of a network/service and/or one or more devices connected or able to be connected to the network. In some embodiments, the set of network requirements includes a set of declarative requirements. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax and software versions to configure a cohesive network of devices is often difficult to achieve. Thus, by only requiring a user/system to specify declarative requirements that specify a desired result applicable across various different types of devices, management and configuration of the network devices becomes more efficient.

In various embodiments, the set of network requirements specify a desired configuration, a desired action, a command, or any other instruction or desired result of one or more devices. One example of the set of network requirements is a set of requirements to establish a network topology. For example, a mesh network (e.g., Layer 3 Clos Network) is desired to be established and the set of network requirements specify desired parameters of the desired mesh network. In a Clos Network, every lower-tier switch (e.g., leaves) is connected to each of the top-tier switches (e.g., spines) in a full-mesh topology. A portion of an example set of requirements that specify an instruction to establish an L3 Clos network configuration received via a received requirements file is below:

Network topology type=Clos
    # of spines=16
    # of leaves=128
    IP address pool=10.0.0.0/24

The above requirements specify that a Clos network with 16 spine network switches and 128 leaf network switches should be established and the switches of the Clos network should be assigned an IP address from the range 10.0.0.1 through 10.0.0.255.

In some embodiments, the set of requirements is verified for validity and correctness. For example, it is verified that the set of network requirements has been received from an authorized and validated source, the provided requirement specification syntax is correct, valid requirements have been provided, all required parameters for a desired result have been specified, and provided requirements are able to be achieved via available hardware/software resources/devices.

At 204, at least a portion of the set of network requirements is published to a system data store. For example, the set of network requirements are published to data store 104 of FIG. 1. In some embodiments, the interaction agent is stateless. For example, the interaction agent does not maintain its own storage that tracks states of requirement processing and communication. Rather than store and keep track of its state data, the state data is stored/published to a remote network data store (e.g., data store 104 of FIG. 1). By being stateless, the interaction agent may be quickly replaced/restarted when it encounters an error without the need to restore state information in the replaced component.

In some embodiments, publishing the set of network requirements includes storing the set of network requirements in the system data store to allow an application agent to read and access the published set of requirements. Thus rather than directly communicating the set of network requirements to the application agent, the interaction agent publishes the set of requirements to the storage to communicate the information to the application agent. In some embodiments, publishing the set of requirements includes selecting one or more application agents that are to receive appropriate network requirements. For example, there exists a plurality of different application agents and each application agent performs a different type of processing and/or processing for a different set of one or more network devices. In order to achieve/complete the set of network requirements, the set of network requirements may need to be routed to the appropriate application agent for further processing. In some embodiments, the set of network requirements are processed to identify which application agent should receive which portion (or all) of the set of requirements and the requirement(s) to be received by each appropriate application agent is published to a different storage location or identified by a different identifier of the system data store corresponding to the appropriate application agent. For example, the data store includes different data records corresponding to each different application agent and requirement(s) may be communicated to an application agent by publishing requirements to the corresponding data record of the desired application agent. In another example, an identifier included in the published data identifies which application agent should receive the published data.

In some embodiments, the received set of requirements is modified prior to being published. For example, the received set of network requirements is translated into a form that can be published to a data store. In another example, additional requirements determined to be required to achieve the received set of requirements are added. In another example, one or more requirements determined to be not required to achieve the received set of requirements are removed. In another example, one or more requirements of the received set of requirements are modified.

In some embodiments, publishing the set of requirements includes storing/creating an identifier in the system data store that identifies the status of one or more requirements of the set of network requirements. For example, an identifier is stored in the system data store that identifies that the set of network requirements have been published in the system data store and is ready to be processed by one or more application agents. As the set of network requirements are processed by an application agent and other agents, the status identifier may be updated by an application agent or other agents to provide an update of the status of achieving/completing the corresponding requirements.

Figure 3:
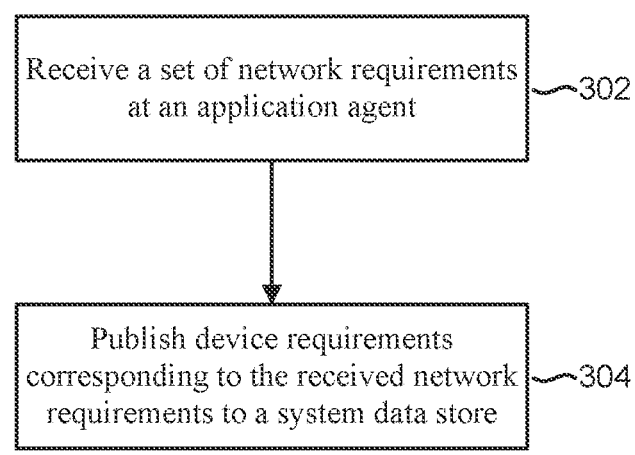
FIG. 3 is a flowchart illustrating an embodiment of a process for publishing device requirements.

FIG. 3 is a flowchart illustrating an embodiment of a process for publishing device requirements. The process of FIG. 3 may be implemented on management server 102 of FIG. 1. In some embodiments, the process of FIG. 3 is performed by application agent 114 of FIG. 1.

At 302, a set of network requirements is received at an application agent. In some embodiments, the application agent is application agent 114 of FIG. 1. In some embodiments, the application agent is a software and/or hardware component that manages desired requirements, configurations and status updates across various network devices. For example, the application agent provides instructions to and receives status information from various devices of a network being managed. In some embodiments, different types of application agents that perform different functions may exist. For example, network requirements are provided to a specific application agent by matching the requirements to the specific functionality of the specific application agent.

In some embodiments, the received set of requirements is the set of requirements published in 204 of FIG. 2. In some embodiments, receiving the set of network requirements includes receiving an indication that the set of requirements have been stored in a data store for the application agent. For example, a system data store such as data store 104 of FIG. 1 includes a data record where data for the application agent can be published and/or the system data store recognizes where a published data should be routed based on an included identifier. Each different application agent may subscribe to one or more data records of the system data store and/or subscribe to one or more identifiers that identify content to be routed to the subscribed application agent. In one example, the system data store includes a different data record for each different application agent and the each application agent subscribes to at least its corresponding data record. In another example, application agent subscribes to an identifier and the system data store routes published data with the identifier to the subscribed application agent.

In some embodiments, by subscribing to a data record, the application agent may be provided a notification by the data storage in the event data is published to a subscribed data record and/or includes a subscribed data identifier. In some embodiments, by subscribing to a data record and/or a data identifier, the application agent may be automatically provided/sent any data published to the subscribed data record and/or identified by the data identifier. In some embodiments, the receiving the set of network requirements includes receiving an indication that the set of network requirements of interest have been stored in the data store and the application agent requests and obtains the set of network requirements of interest. In some embodiments, the receiving the set of network requirements includes automatically receiving content of the set of network requirements subscribed by the application agent. In some embodiments, receiving the set of requirements includes directly receiving the set of requirements from an interaction agent.

At 304, device requirements corresponding to the received requirements are published to a system data store. In some embodiments, the network requirements received by the application agent are processed by the application agent to determine the appropriate device requirements for one or more devices that are to be configured to implement the received network requirements. For example, the application agent analyzes the received network requirements and determines one or more devices (e.g., devices determined and selected by device type, capability, quantity required, processing capability, etc. required to implement received requirements) that will be utilized to implement the received network requirements. For each of the one or more devices that are to be configured, the application agent determines its individual device requirements.

In some embodiments, the device requirements for each individual device are declarative requirements. For example, the device requirements include a specification of a desired configuration, setting, and/or other specification of a network device. The declarative requirements express a desired configuration of a network device without specifying an exact native device configuration and control flow instructions. By utilizing declarative requirements, what should be accomplished in the network device is specified rather than exact native hardware instructions. By utilizing declarative requirements rather than imperative instructions, the application agent is relieved of the burden of determining the exact device programming and configuration syntax required to achieve a desired result. For example, it is often difficult and burdensome for a single component to be configured and updated to know exact imperative syntax and configuration paradigm to configure each device of a network when various different types of devices from different vendors may utilized and interchanged dynamically on the network.

In some embodiments, publishing the device requirements includes storing the device requirements in a system data store (e.g., data store 104 of FIG. 1) to allow one or more proxy agents to read and access the published set of device requirements. Thus rather than directly communicating the device requirements to one or more selected devices that will be utilized to implement the received network requirements, the application agent publishes the device requirements to the system storage to communicate the information to one or more proxy agents that will utilize the device requirements to configure the selected devices. In some embodiments, publishing the set of requirements includes selecting one or more proxy agents that are to receive applicable device requirements. For example, there exists a plurality of different proxy agents that are each assigned to a different device of the network. In order to achieve and implement the desired network requirements, the corresponding device requirements may need to be routed to the appropriate proxy agents for further processing. The device requirements to be received by each appropriate proxy agent may be published to different storage locations of the system data store corresponding to the appropriate proxy agent. For example, the system data store includes different data records corresponding to each different proxy agent and appropriate device requirements may be communicated to a corresponding proxy agent by publishing the appropriate device requirements to the corresponding data record of the desired proxy agent. In some embodiments, device requirements for each device/proxy agent are published using an identifier that identifies the device/proxy agent that is receiving the corresponding device requirements.

In one example, the set of requirements to establish the L3 Clos network configuration described previously is received at the application agent and the application agent analyzes the received requirements and determines and identifies devices that will be utilized to implement the desired network configuration of the received network requirements. The example L3 Clos network requirements specify the number of spine network switch devices to be 16 and the number of leaf network switch devices to be 128. In total, the application agent will determine and identify 144 devices that will need to be configured to implement the desired Clos network. For each of the devices that are to be utilized, the application agent determines the individual device requirements in implementing the desired Clos network. The individual device requirements may be stored in a corresponding system data store entry for each device. For example, the application agent publishes the individual device requirements in 144 different data entries of the data store and each proxy agent of each device accesses these data entries to receive the corresponding device requirements. In the L3 Clos network example, below is one example of device requirements for one of the 144 different device requirements.

Role=spine
IP address=10.0.0.3
Neighbors=[(Leaf-1, 10.0.0.7), (Leaf-2, 10.0.0.15), . . . (Leaf-128, 10.0.0.176)]
Status=defined The above device requirements specify that in a Clos network, one network switch device is to be a spine switch with IP address 10.0.0.3. The leaf switches connected to this spine switch devices have been also identified.

In some embodiments, publishing the device requirements includes storing/creating an identifier in the system data store for each device requirement of devices to be utilized to implement the received network requirements. The published "Status" device requirement in the previous Clos network example specifies a status of achieving the device requirement. This status identifier may be updated by a proxy agent of the network switch device as the device requirements are achieved/completed. For example, an identifier is stored in the system data store that identifies that the device requirements for a device have been published in the system data store and are ready to be processed by an appropriate proxy agent (e.g., set in "defined" state). As the device requirements are processed by the proxy agent, the status identifier may be updated by the proxy agent to provide an update of the status of achieving the device requirements.

Figure 4:
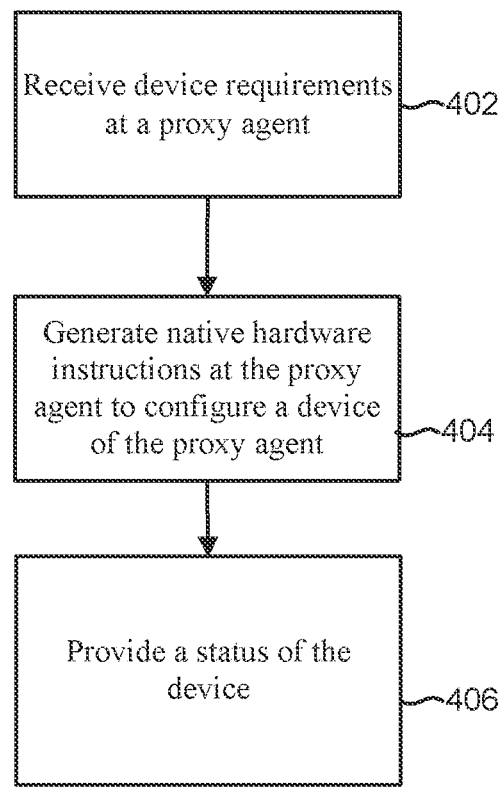
FIG. 4 is a flowchart illustrating an embodiment of a process for generating native hardware instructions.

FIG. 4 is a flowchart illustrating an embodiment of a process for generating native hardware instructions. The process of FIG. 4 may be implemented on network device 106 and/or 108 of FIG. 1. In some embodiments, the process of FIG. 4 is performed by proxy agent 116 and/or 118 of FIG. 1.

At 402, device requirements are received at a proxy agent. In some embodiments, the proxy agent is proxy agent 116 or 118 of FIG. 1. In some embodiments, the proxy agent is a software and/or hardware component that manages and implements device requirements for an associated/assigned device. In some embodiments, different types/versions of proxy agents exist for different network devices. For example, a proxy agent provides conversion functionality between a device requirement and implementing native instructions specific to a device and the proxy agent that can generate native instructions for a specific device (e.g., specific to vendor, operating system, protocol, version, etc. of the device) is selected for the specific device. By separating functionality between the interaction agent, application agent, and proxy agent, only the proxy needs to handle specific native instructions of a device. Thus, when a new type or version of a device is added to a network, only a new proxy agent for the new device is required while the interaction agent and application agent may remain unchanged. This may allow simplified administration of various different types of devices of a network. The proxy agent may be installed on a device managed by the proxy agent. In some embodiments, the proxy agent is remote from the managed device. In some embodiments, one proxy agent may manage a plurality of devices. For example, a single proxy agent may manage a plurality of devices of the same type.

In some embodiments, the received device requirements are the device requirements published in 304 of FIG. 3 for a device of the proxy agent. In some embodiments, receiving the device requirements includes receiving an indication that the device requirements have been stored in a system data store for the proxy agent of a specific device. For example, a system data store such as data store 104 of FIG. 1 includes a data record where data for the proxy agent can be published. Each different proxy agent may subscribe to one or more data records of the system storage that correspond to a device being managed by the respective proxy agent. For example, the system data store includes a different data record for each device of the network and the each proxy agent subscribes to the corresponding data record of its assigned device. In some embodiments, each different proxy agent subscribes with the system data store one or more identifiers that identify the device associated with the corresponding proxy agent. For example, any published data identified by the subscribed identifier is notified to the subscribed proxy agent. In some embodiments, by subscribing to a data record and/or an identifier, the proxy agent may be provided a notification by the data store in the event data is published to the subscribed data record and/or data associated with the identifier has been published. In some embodiments, by subscribing to a data record and/or an identifier, the proxy agent may be automatically provided/sent any data published to the subscribed data record and/or identified by the identifier. In some embodiments, the receiving the device requirements includes receiving an indication that the device requirements have been stored to a data store due to a subscription and the proxy agent requests and obtains the device requirements from the data store. In some embodiments, the receiving the device requirements includes automatically receiving content of device requirements from a data store due to a subscription. In some embodiments, receiving the device requirements includes directly receiving the device requirements from an application agent.

At 404, native hardware instructions are generated at the proxy agent to configure a device of the proxy agent. In some embodiments, the device requirements received by the proxy agent are processed by the proxy agent to generate the native hardware instructions implementing the received device requirements. For example, received declarative instructions are converted to imperative instructions. In some embodiments, the native hardware instructions are in the native programming/configuration syntax of the device. For example, the native hardware instructions are generated in a format native to a configuration software interface of the device. In some embodiments, the native hardware instructions are instructions that can be understood/processed by a software component of the device to configure the device. In some embodiments, the native hardware instructions are in a form that can be directly utilized by the device to configure the device. In some embodiments, the native hardware instructions are executed by the device. For example, the generated native hardware instructions are issued for execution on the device.

In one example, the device requirements to become a spine switch of the L3 Clos network configuration described previously in the specification are received at the proxy agent and the proxy agent analyzes the received device requirements and generates native network switch device instructions to configure the network switch device to become a spine switch of a Clos network with the specified IP address and specified neighbors.

At 406, a status of the device is provided. In some embodiments, step 406 is optional and may not be performed. In some embodiments, providing the status includes publishing an identifier of the status to a system data store (e.g., data store 104 of FIG. 1). In some embodiments, providing the status includes providing an indication of status of achieving the received device requirements. For example, a status indication of a stage of the processing of the device requirements is provided. In some embodiments, providing the status indication includes updating a status identifier in a system data store. For example, a status identifier is updated in data store 104 of FIG. 1 (e.g., allowing the proxy agent to be stateless). In some embodiments, the updated status identifier is the identifier corresponding to the "Status=defined" published in the Clos network device requirement example described previously.

In some embodiments, the status of the device indicates a status of implementing device requirements on the device. For example, the status may be one of six states. The initial first example state is a "defined" state that indicates that the device requirement has been successfully published to a system data store by an application agent. A second example state is a "staged" state that is indicated by a receiving proxy agent that the proxy agent has received the device requirements and has allocated resources to implement the device requirements. A third example state is a "rendered" state that indicates that the proxy agent has generated native hardware instructions corresponding to the device requirements. A fourth example state is a "deployed" state that indicates the proxy agent has issued the generated native hardware instruction for execution on the device. A fifth example state is an operational state that indicates that the generated native hardware instructions are successfully executed on the device. However, when an error is encountered, a sixth example "error" state may be indicated to indicate that an error has been encountered.

In some embodiments, the status of the device indicates a health state of the device. For example, indication of information such as processing load, CPU utilization, storage utilization, memory utilization, version identification, errors encountered, network status, network bandwidth, network latency, etc. may be provided. In some embodiments, the status of the device indicates a packet drop rate. For example, an indication of a Ternary Content Addressable Memory (i.e., TCAM) utilization of the device is provided by the proxy agent. In another example, an indication is provided when a TCAM table is overflowed.

Figure 5:
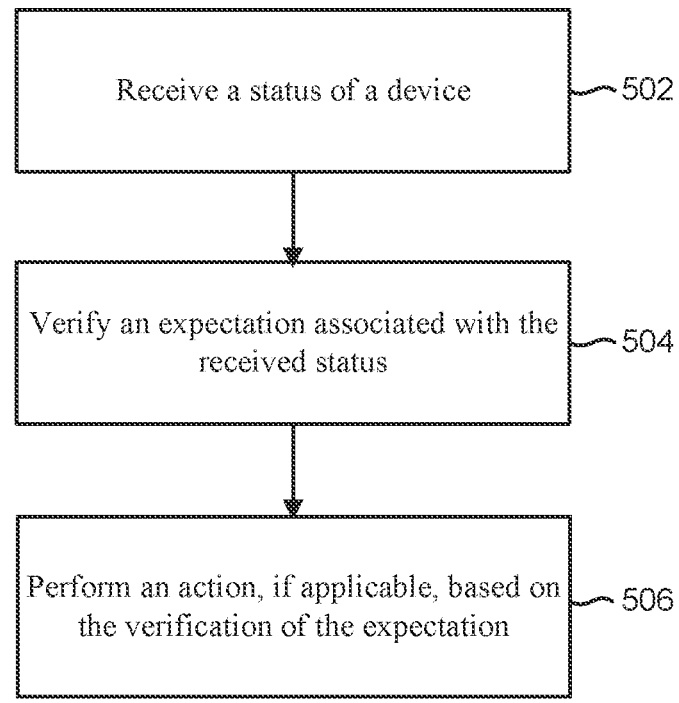
FIG. 5 is a flowchart illustrating an embodiment of a process for verifying an expectation.

FIG. 5 is a flowchart illustrating an embodiment of a process for verifying an expectation. The process of FIG. 5 may be implemented on management server 102 of FIG. 1. In some embodiments, the process of FIG. 5 is performed at least in part by application agent 114 of FIG. 1.

At 502, a status of a device is received. In some embodiments, the status of the device is a status of a resource of the device. In some embodiments, the status of the device is a status of device requirements being implemented by the device. In some embodiments, the status of the device is a status of any errors of the device. In some embodiments, the status of the device is the status provided in 406 of FIG. 4. In some embodiments, the received status is one of a plurality of statuses received from the same proxy agent or different proxy agents of one or more different devices.

In some embodiments, the status is received via a system data store such as data store 104 of FIG. 1. For example, the application agent has subscribed with the data store to receive status published in the data store. In some embodiments, rather than subscribing with the data records, the application agent periodically polls/checks the data store. In some embodiments, the status of the device is received by an application agent directly from a proxy agent.

At 504, an expectation associated with the received status is verified. For example, one or more rules or tests are performed to verify that the status is as expected, specified, and/or within a range. In some embodiments, the expectation includes one or more tests to be performed to verify that a set of requirements provided by an interaction agent (e.g., published in 204 of FIG. 2 and received in 302 of FIG. 3) has been successfully achieved. For example, the received set of network requirements in 202 of FIG. 2 specifies one or more tests to be performed to verify that the set of network requirements has been successfully achieved. For example, in the L3 Clos network example discussed throughout the specification, a test to verify that routing tables have been successfully updated and leaf switch nodes are aware of neighbors to reflect the Clos network configuration a received along with the network requirements received in 202 of FIG. 2. This test may be published by the interaction agent along with the requirements in 204 of FIG. 2 and the application agent receives the test as the expectation for verification. In some embodiments, the expectation identifies an acceptable range for a resource utilization indicator. In some embodiments, the expectation identifies an error state of the received status.

At 506, an action, if applicable, is performed based on the verification of the expectation. In some embodiments, no action is performed if the received status is as expected, specified, and/or within a range. In some embodiments, the expectation identifies the responsive action to be performed based on the received status. In some embodiments, performing the action includes reporting the received status. For example, a result of a test of the expectation and/or the received status is reported (e.g., report that a test to verify that the set of network requirements have been successfully achieved has passed to indicate that the set of network requirements have been achieved). In some embodiments, reporting the received status includes summarizing a plurality of received statuses. Reporting the status may include providing the report/status to an interaction agent (e.g., the interaction agent may provide the report/status to a user). In some embodiments, reporting the status includes publishing/updating a data record of a system data store such as data store 104 of FIG. 1. For example, a status identifier is published to a data record of the data store that is subscribed by an interaction agent.

In some embodiments, performing the action includes configuring, moving, removing, and/or adding a device of a network and/or a process/program of a device of the network. For example, the application agent generates instructions (e.g., publishes device requirements to a system data store for a proxy agent to implement on a device) to automatically mitigate/fix an error indicated by the status (e.g., repair/replace device that has encountered an error). In one example, when a proxy agent provides a status update that its associated device is overloaded, the application agent may add a new device to a network to offload processing and/or move a processing task of the overloaded device to another network device. The collected status information may be provided by an application agent to an interaction agent as a report and/or a request for action.

In some embodiments, performing the action includes allowing another application agent that is configured to perform the action to perform the action. For example, an application agent that has determined that the received status indicates that the action should be performed informs another application agent (e.g., by publishing to a data store subscribed by the second application agent) to perform the action. In some embodiments, an interaction agent manages which application agent is to perform the action. For example, the interaction agent is informed of the status and instructs (e.g., by publishing requirements to a data store) an application agent that is able to perform responsive action to perform the responsive action. In some embodiments, performing the responsive action includes providing responsive requirements in response to the status that is received in 302 of FIG. 3. For example, the responsive requirements are translated to device requirements that will be provided to proxy agents to be implemented.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
storing at least a portion of a set of network requirements to a data record of a data store prior to configuring any one of a plurality of network devices based on the set of network requirements;
based on determining that an application agent is subscribed to the data record storing the portion of the set of network requirements, accessing, using the application agent, the portion of the set of network requirements stored in the data record of the data store;
generating, using the application agent, one or more declarative device requirements for the plurality of network devices based on the accessed portion of the set of stored network requirements, wherein the one or more declarative device requirements indicate a desired configuration for the plurality of network devices without specifying one or more instructions specific to a network device of the plurality of network devices;
storing, to the data store, the one or more declarative device requirements for the plurality of network devices; and
outputting, to each proxy agent component of a set of proxy agent components, at least a respective portion of the one or more declarative device requirements, wherein a proxy agent component of the set of proxy agent components is configured to generate the one or more instructions specific to the network device.

2. The method of claim 1, wherein the set of proxy agent components comprises a plurality of proxy agent components and wherein each proxy agent component of the plurality of proxy agent components is configured to generate respective one or more native hardware instructions for a corresponding network device of the plurality of network devices based on the respective portion of the one or more declarative device requirements.

3. The method of claim 2, wherein at least one of the set of proxy agent components is included in the corresponding network device of the plurality of network devices.

4. The method of claim 1, wherein the application agent is included in a management server and at least one of the set of proxy agent components is included in the management server.

5. The method of claim 1, further comprising outputting a notification based on the determining that the application agent is subscribed to the data record storing the portion of the set of network requirements, wherein the accessing the stored network requirements is further based on the outputting of the notification.

6. The method of claim 1, wherein the set of network requirements is received from a user.

7. The method of claim 1, wherein the set of network requirements is received via an application programming interface.

8. The method of claim 1, wherein the set of network requirements is a set of declarative network requirements.

9. The method of claim 1, wherein the set of network requirements specify a desired mesh network topology.

10. The method of claim 1, wherein generating the one or more declarative device requirements comprises identifying the plurality of network devices that are to be configured based on the set of network requirements.

11. The method of claim 1, wherein the plurality of network devices includes a network switch.

12. The method of claim 1, wherein a proxy agent component of the set of proxy agent components provides, for use by a management server, a device status of at least one of the plurality of network devices.

13. A system comprising one or more processors configured to:
- store at least a portion of a set of network requirements to a data record of a data store prior to configuring any one of a plurality of network devices based on the set of network requirements;
- based on a determination that an application agent is subscribed to the data record storing the portion of the set of network requirements, access, using the application agent, the portion of the set of network requirements stored in the data record of the data store;
- generate, using the application agent, one or more declarative device requirements for the plurality of network devices based on the accessed portion of the set of stored network requirements, wherein the one or more declarative device requirements indicate a desired configuration for the plurality of network devices without specifying one or more instructions specific to a network device of the plurality of network devices;
- store, to the data store, the one or more declarative device requirements for the plurality of network devices; and
- output, to each proxy agent component of a set of proxy agent components, at least a respective portion of the one or more declarative device requirements, wherein a proxy agent component of the set of proxy agent components is configured to generate the one or more instructions specific to the network device.

14. The system of claim 13, wherein the set of proxy agent components comprises a plurality of proxy agent components and wherein each proxy agent component of the plurality of proxy agent components is configured to generate respective one or more instructions for a corresponding network device of the plurality of network devices based on the respective portion of the one or more declarative device requirements.

15. The system of claim 14, wherein at least one of the plurality of proxy agent components is included in the corresponding network device of the plurality of network devices.

16. The system of claim 13, wherein the application agent is included in a management server and at least one of the plurality of proxy agent components is included in the management server.

17. The system of claim 13, wherein the one or more processors are further configured to output a notification based on the determination that the application agent is subscribed to the data record storing the portion of the set of network requirements, wherein the one or more processors are configured to access the stored network requirements further based on the outputting of the notification.

18. The system of claim 13, wherein the set of network requirements is received from a user.

19. The system of claim 13, wherein the set of network requirements is received via an application programming interface.

20. A non-transitory computer-readable medium comprising instructions for causing a processor to:
- store at least a portion of a set of network requirements to a data record of a data store prior to configuring any one of a plurality of network devices based on the set of network requirements;
- based on a determination that an application agent is subscribed to the data record storing the portion of the set of network requirements, access, using the application agent, the portion of the set of network requirements stored in the data record of the data store;
- generate, using the application agent, one or more declarative device requirements for the plurality of network devices based on the accessed portion of the set of stored network requirements, wherein the one or more declarative device requirements indicate a desired configuration for the plurality of network devices without specifying one or more instructions specific to a network device of the plurality of network devices;
- store, to the data store, the one or more declarative device requirements for the plurality of network devices; and
- output, to each proxy agent component of a set of proxy agent components, at least a respective portion of the one or more declarative device requirements, wherein a proxy agent component of the set of proxy agent components is configured to generate the one or more instructions specific to the network device.

* * * * *